Oct. 11, 1960 M. J. H. STAAR 2,955,825

MOVABLE TONE ARM REST

Filed April 11, 1957 4 Sheets-Sheet 1

INVENTOR
MARCEL JULES HELENE STAAR
by: Carlson, Pitzner, Hubbard & Wolfe
ATTYS.

INVENTOR
MARCEL JULES HELENE STAAR
by: Carlson, Pitzner, Hubbard & Wolfe
ATTYS.

INVENTOR
MARCEL JULES HELENE STAAR
by: Carlson, Pitzner, Hubbard & Wolfe
ATTYS.

Oct. 11, 1960 M. J. H. STAAR 2,955,825

MOVABLE TONE ARM REST

Filed April 11, 1957 4 Sheets-Sheet 4

INVENTOR
MARCEL JULES HELENE STAAR by: Carlson, Pitzner, Hubbard & Wolfe
ATTYS.

United States Patent Office 2,955,825

Patented Oct. 11, 1960

2,955,825

MOVABLE TONE ARM REST

Marcel Jules Helene Staar, 53 Ave. du Derby, Brussels, Ixelles, Belgium

Filed Apr. 11, 1957, Ser. No. 652,172

Claims priority, application Belgium Aug. 14, 1956

12 Claims. (Cl. 274—1)

This invention relates to phonographic apparatus and more particularly to a tone arm rest mechanism.

It has long been a problem in connection with record player apparatus to protect the tone arm and particularly the pick-up stylus against damage when the player is moved. This problem is encountered not only in the case of portable record players, but also where furniture wherein the record player is permanently installed is shifted about in a room, or from house to house. Ordinarily, to prevent damage under such circumstances, the tone arm is either tied in place or completely removed from the apparatus, and this, of course, requires care and takes considerable time to accomplish.

It is, therefore, the general aim of the present invention to solve this problem by providing means for protecting record player apparatus, and particularly the tone arm, against damage and for maintaining such apparatus free of dust and dirt during periods the record player apparatus is used as well as during transportation or storage thereof. In carrying out the foregoing, it is an object of this invention to provide as a permanent part of the record player itself a manually operable attachment in the form of a movable tone arm rest mechanism which is effective to provide means for rigidly holding the tone arm against movement and thus for guarding the pick-up stylus against damage when the player is moved.

Another object is to provide a brush which is effective as an incident to movement of the tone arm rest mechanism to brush clean the stylus. Another object is to employ the movable tone arm rest mechanism for carrying out certain control operations in connection with the functioning of the player, such as for controlling the operation of an "on-off" turntable motor switch, and controlling operation of the turntable drive.

An additional object of the present invention is to provide a tone arm rest mechanism offering the foregoing features and susceptible of giving long periods of trouble-free operation, yet due to its simplicity and precision in construction and arrangement the mechanism is inexpensive to manufacture and assemble.

Additional objects will appear from the following description, taken in connection with the accompanying drawings, wherein.

Figure 1:
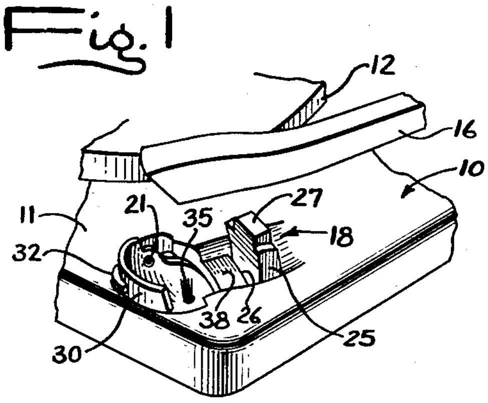
Figures 1 and 2 are perspective views of a tone arm rest constructed in accordance with this invention.

While the invention is susceptible of various modifications and alternative constructions, there is shown in the drawings and will herein be described in detail a preferred embodiment of the invention and an alternative form thereof. It is understood, however, that it is not thereby intended to limit the invention to the specific forms disclosed but, on the contrary, it is intended to cover all modifications, alternative constructions and equivalents falling within the spirit and scope of the invention as expressed in the appended claims.

Figure 2:
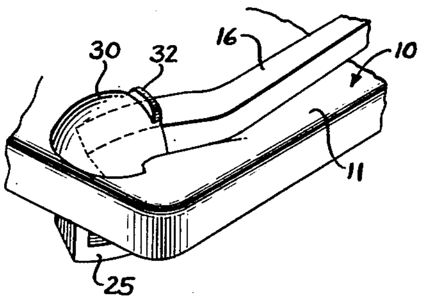

Turning now to the drawings, Figures 1 and 2 illustrate record player apparatus embodying the present invention. This apparatus is mounted on a base 10 having a plate member 11 and includes a turntable 12, a drive for the turntable including a motor driven pulley 13, and an idler wheel 14 supported on an idler wheel mount 15 in such a manner that the idler wheel is resiliently biased into peripheral engagement with the pulley and the turntable. In addition the record player includes a tone arm 16 pivotally mounted on the base 10 by means of a shaft 17 (Figs. 6 and 7) so as to be movable laterally from a playing position over the turntable 12 to a position on a post 18 formed as part of a tone arm rest mechanism mounted on the base adjacent to the edge of the turntable.

In carrying out the invention, the tone arm rest mechanism comprises a movable element 19 which provides a support for the tone arm and also embodies a latch for engaging and rigidly holding the tone arm against movement relative to the record player base. In the present embodiment the element indicated generally at 19 is pivotally mounted in an opening 20 in the base 10 by pins 21 fastened at each side and carried in bearing supports 22 mounted on the base. The tone arm rest element 19 is manually movable about the axis defined by the pins 21 between a tone arm rest position, as shown in Figure 1, and a latch position as shown in Fig. 2.

Figure 3:
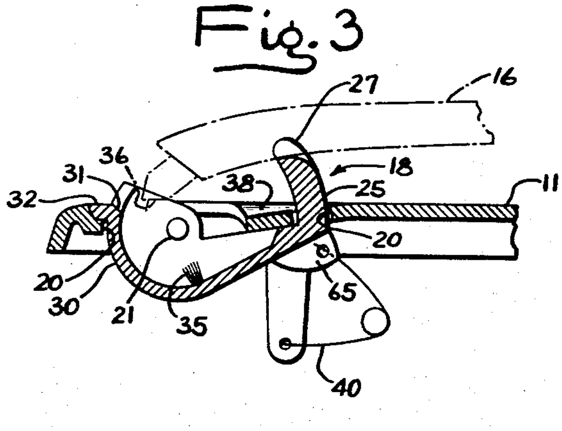
Figs. 3–5 are stop motion views illustrating the tone arm rest of Figures 1 and 2 at successive points in the movement of the rest.

For supporting the tone arm 16 when the element is in the rest position, the post 18 is employed constructed as by means of a curved lug 25 formed as an integral part of the element and extending when the element 19 is in this position, through a substantially rectangular opening 26 in the base so as to stand above the base in a position to receive the tone arm. As shown in Figures 1 and 3, wherein the tone arm rest element 19 is depicted in the rest position for receiving and supporting the tone arm, the end 27 of the lug 25 is concave in form so as to conform generally to the configuration of the under surface of the tone arm.

For the tone arm latch a portion 30, also an integral part of the rest element 19, is utilized, in the present instance formed like a cap and mounted so as to protrude from the base of the apparatus when the rest element is in the latch position. Consequently, the latch portion 30 is spaced on the opposite side of the pivotal axis of the element from the post or lug 26 which is provided for supporting the tone arm when the element is in the rest position. As a result of this arrangement, as the rest element 19 turns or pivots on its axis, the latch portion 30 and the lug portion 26, respectively, move to protrude from or disappear within the base 15. By forming the latch portion of the element by means of a curved piece as illustrated, the end 31 thereof fits closely about the upper surface of the tone arm and prevents movement of the tone arm when the latch is fully engaged so as to rigidly hold the tone arm against movement relative to the base. A raised finger piece 32 for facilitating manually moving the tone arm rest element 19 is fashioned on the upper edge of the latch portion, this same finger piece 32 also operating to engage the upper edge of the base when the rest element 19 is pivoted to the rest position and thus operates as a stop, as shown in Figure 1.

Figure 4:
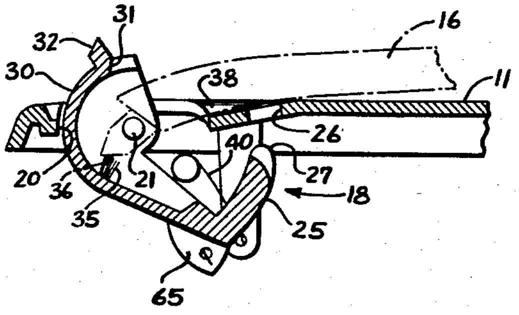
Figure 5:
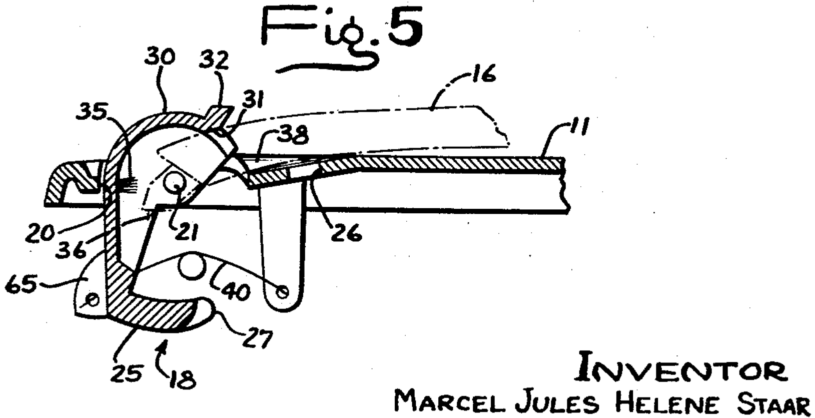

In addition to functioning as a tone arm rest, as shown in Figure 1, and as a tone arm latch as shown in Fig. 2, in keeping with the present invention a brush 35 may be supported by the movable element 19, as also shown in Figure 1, for engagement with the tone arm stylus 36 for brush cleaning the stylus. Referring to Figs. 3–5, with the rest element 19 in the rest position as shown in Fig. 3 and the lug 25 borne thereon supporting the tone arm, the brush is under the end of the tone arm and spaced from the stylus. Upon pivotal movement of the element from the rest position of Fig. 3 to the latch position of Fig. 5, the brush 35 is moved past the tone arm stylus 36, when the tone arm is on the rest, and consequently, the brush is effective to brush clean the stylus. It will be apparent that upon pivotal movement of the rest element 19 in a clockwise direction as viewed in Figs. 3–5, the lug 25 which forms the post 18 supporting the tone arm above the base of the record player when the element is in the rest position (Fig. 3), drops down under the base plate 11 of the apparatus, allowing the tone arm likewise to drop. So as to prevent damage to the stylus 36 and for supporting the tone arm when lowered and when the rest is in the latch position, in the plate 11 adjacent to the opening 20 in which the tone arm rest is pivotally mounted, there is formed a shallow depression 38 conforming, in general, to the shape of the under side of the tone arm and in which the tone arm may seat as the lug on the rest element drops away from under it. The position of the tone arm when resting on the base plate itself is shown in Figs. 4 and 5. For guarding and shielding the end of the tone arm and the stylus against damage, the latch portion 30 of the tone arm rest element is fashioned cap-like of substantially spherical form and thereby also forms an enclosure for preventing the entrance of dust and dirt to the stylus and pick-up cartridge. The latch portion of the element thus is also useful, for example, during periods of storage or when the apparatus is not in use, to maintain these operating parts of the record player dust free. During transport of the apparatus, in addition to holding the tone arm rigidly against movement, the cap-like shield or cover prevents physical damage to the cartridge and stylus of the tone arm by forming a protective guard.

A feature of the present invention is illustrated in Figs. 3–5 wherein a sear spring 40 is fastened to the tone arm rest element 19 and the base 10, respectively, so as to make the operation of the element in shifting between the rest and latch positions semi-automatic. With the arrangement as illustrated in Figs. 3–5, in the course of pivotal movement of the element 19 between these positions, the sear spring passes over toggle center. Consequently, initially as shown in Fig. 3, the spring 40 resiliently and yieldingly opposes pivotal movement of the element 19 from the rest position there depicted. Thus the lug 25 on the rest element provides a yielding support for the tone arm. Upon movement of the tone arm rest element 19 towards the latch position (Fig. 5), the spring passes a point (between Figs. 3 and 4) wherein the resilient force opposing pivotal movement reverses to assist such pivotal movement, and as shown in Figs. 4 and 5, this sear spring 40 is effective once this point is reached to pivot the element clockwise and effect latching engagement with the tone arm. The spring 40 forms a toggle with the element 19 itself forming a lever pivoted on the pins 20, and while initially requiring actuation, as by manually pressing down the post or lug 25 as by means of the tone arm so as to start the clockwise pivotal movement from the position of Fig. 3, the spring is effective to take over and perform the final portion of that movement automatically. While the above operation has been described in connection with a sear spring and toggle arrangement, it will be understood by one skilled in the art that any equivalent mechanism may, if desired, be substituted.

Figure 6:
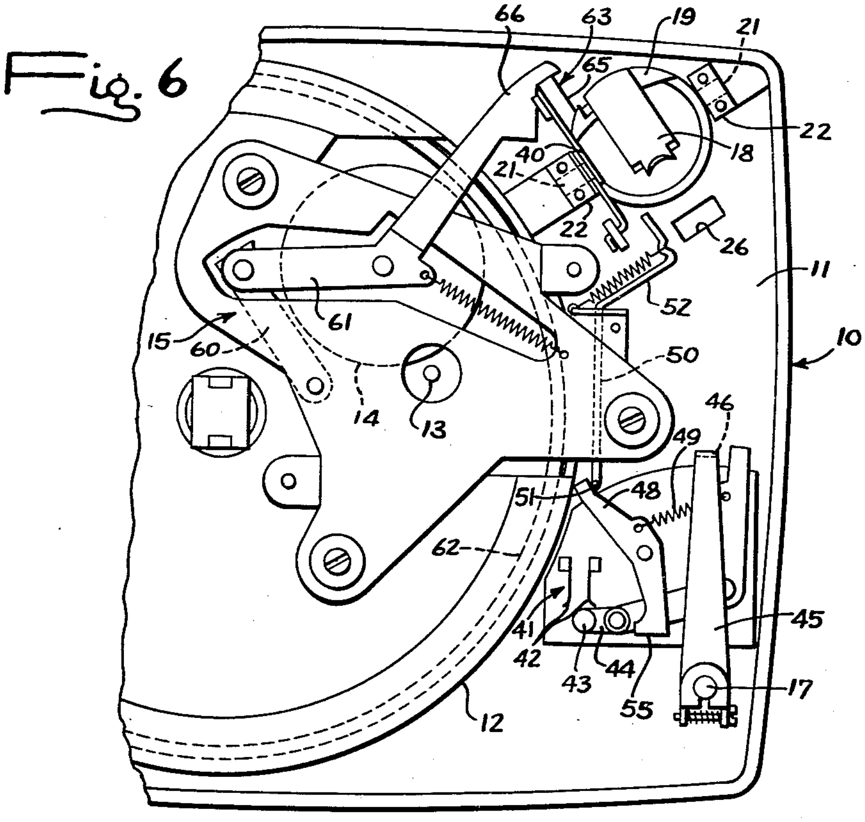
Fig. 6 is a view in elevation of the under side of a record player base equipped with the tone arm rest illustrated in Figures 1 and 2 and showing how the device (shown in latch position) may be coupled to a turntable motor switch and an idler wheel mount.
Figure 7:
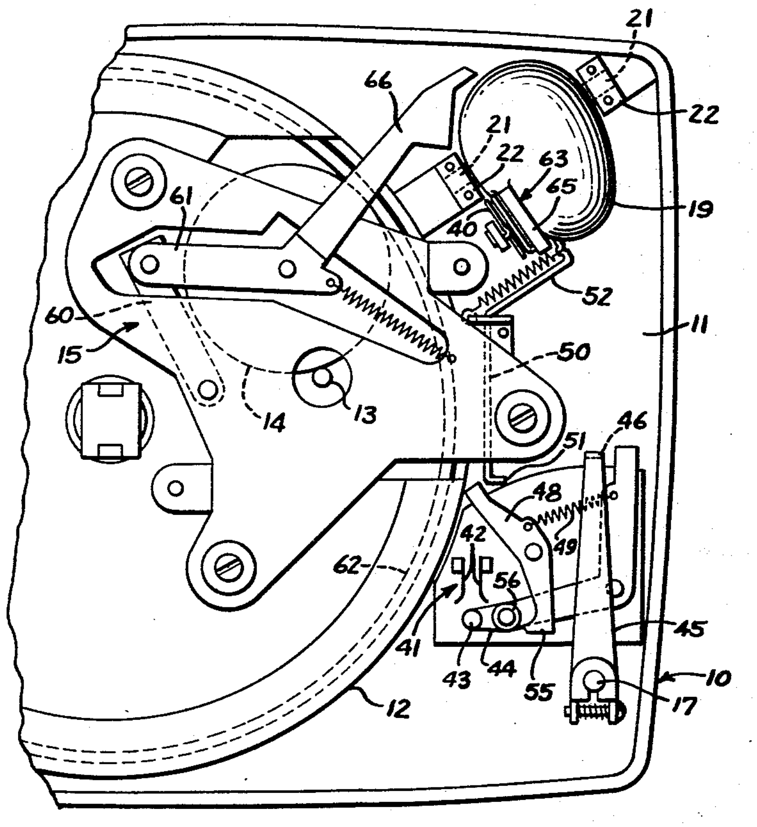
Fig. 7 is a view similar to Fig. 6 with the tone arm element in rest position.

In keeping with the invention, the movement of the tone arm rest element 19 may be used to perform other operations in connection with record player apparatus of which it is a part. For example, referring to Figs. 6–9, the tone arm rest element 19 may be employed to control the operation of a turntable motor switch 41. For illustrative purposes, this switch comprises two switch blades 42 and may be closed by interposing a contact 43 borne by a switch member 44 in the form of a bell crank lever pivotally supported on the plate 11 of the base of the record player and actuatable by the tone arm. In the present instance, movement of the tone arm in a given lateral direction (for example, clockwise in Fig. 7) closes the switch 41 to start the turntable motor. For carrying out this switch-closing function, the shaft 17 on which the tone arm is mounted is provided with an arm 45 which underlies, in the assembled apparatus, the switch member 44. The end of the arm 45 remote from the tone arm shaft 17 is bent to form an actuating lug 46 lying at right angles to the arm and extending past the edge of the switch member 44 for actuating the same. Upon clockwise movement of the tone arm shaft 17 so as to pivot the arm 45 carried thereby in the same direction, as shown in Figs. 6 and 7, the lug 46 on the end of the arm engages the bell crank lever 44 (Fig. 8) to move the contact 43 between the leaves of the motor switch 41. In the present arrangement, it is contemplated that such movement of the bell crank lever 44 may be effected by the tone arm and then the tone arm is pivoted in an opposite direction so as to be brought into playing relation over the turntable.

Figure 8:
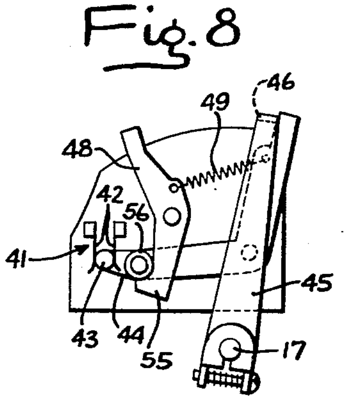
Figs. 8 and 9 are fragmentary views of the turntable motor switch mechanism illustrated in Figs. 6 and 7, showing the mechanism in different stages of operation.
Figure 9:
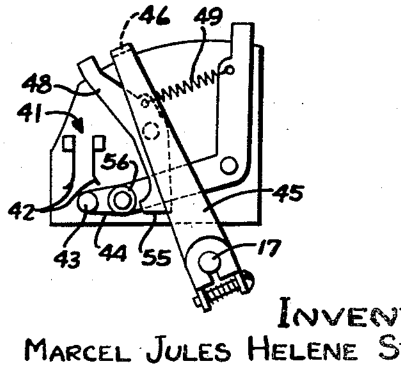

In the present instance, in order to hold the switch 41 closed, a catch 48 is provided for engaging the bell crank lever 44 and holding it in the closed switch position shown in Fig. 8. This catch 48 is pivotally mounted on the base and is connected as by a tension spring 49 to the bell crank lever 44. When the tone arm rest element 19 pivots toward the latch position of Figs. 5 and 6, the catch 48 is moved counter-clockwise out of engagement with the bell crank lever 44 to a point where it is no longer effective in cooperation with the bell crank lever 44 to hold the turntable motor switch 41 closed. For this purpose, on the under side of the base, as shown in Figs. 6 and 7, a linkage is provided including a rod 50 having a right-angle end portion 51, for moving and holding the catch 48 out of engagement with a catch button 56 carried by the bell crank lever 44. A crank 52 on the opposite end of the rod is positioned for engagement by the movable tone arm rest element 19 and is effective upon such contact to rotate the angle end portion of the rod out of engagement with the catch 48. The rod is shown in this position in Fig. 7, and in engagement with the catch 48, in Fig. 6.

Upon movement of the tone arm rest member from the latch position to free the tone arm, the catch 48 is released. Under the urging of the tension spring 49 connected to the bell crank lever, the catch is turned clockwise about its pivot and, as shown in Fig. 8, a hooked portion 55 thereon engages the catch button 56 on the bell crank lever for holding the lever in the closed switch position, after this bell crank lever has been pivoted clockwise to such position by moving the tone arm as explained hereinabove or by some other equivalent means. As will be evident, upon the tone arm approaching the center of the record and reaching the terminal groove therein, or by means (not shown) for actually engaging the catch 48, the catch may be pivoted in a counterclockwise direction from the position shown in Fig. 8, to the position shown in Fig. 9, to free the bell crank lever and turn the turntable motor switch off. For this purpose, the arm 45 mounted on the tone arm shaft 17 may be used. As described above, the end of this arm bears a lug 46. Upon counterclockwise movement of the arm 45, such as occurs when the tone arm moves towards the center of the turntable, as during a record playing operation, this lug 46 engages the catch 48 and the arm is so phased that the motion of the tone arm in the terminal groove shifts the catch counterclockwise, releasing the bell crank lever 44.

Further in keeping with the invention, the tone arm rest mechanism may be employed for shifting the drive mechanism for the turnable into a "zero" or declutched position automatically, and as an incident to locking the tone arm against movement. In the present embodiment, the idler wheel 14 is supported on a mount 15 embodying a toggle linkage including the first lever 60 and the second lever 61, and is resiliently biased into engagement with the rim 62 on the turntable 12 and the drive pulley 13 for drive purposes. For the purpose of declutching the idler wheel when the tone arm is latched by the tone arm rest of this invention, the tone arm rest element 19 is formed with a portion 63 for engaging the idler wheel mount 15 for shifting the mount and, consequently, the idler wheel 14. This is important, for example, during periods of storage or non-use, so that flat spots the result of continual pressure, will not be formed in the edge of either the idler wheel or the pulley. As shown in Fig. 6, upon movement of the tone arm rest element 19 to the latch position, the lug 65 to which the sear spring 40 is fastened engages an arm 66 formed on the second toggle lever 61 and shifts the idler wheel 14 from peripheral engagement both with the rim of the turntable and with the pulley on the turntable motor shaft. The idler wheel is thus declutched and is re-engaged or clutched upon pivotal movement of the tone arm rest element 19 to the rest position, as shown in Fig. 7.

Figure 10:
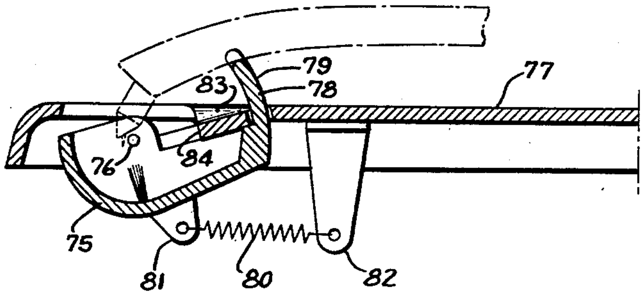
Figs. 10–12 are stop motion views illustrating a modified form of the tone arm rest illustrated in the previous figures.
Figure 11:
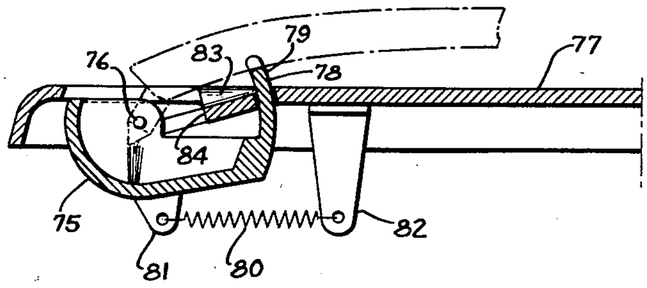
Figure 12:
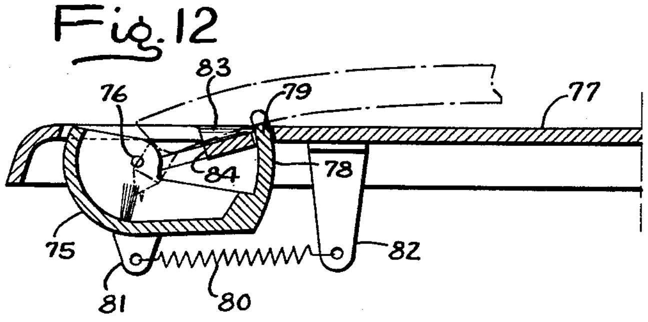

While as illustrated in Figs. 1–9, the tone arm mechanism provides for rigidly holding the tone arm against movement and also includes a brush for brush cleaning the stylus, in the alternative embodiment thereof illustrated in Figs. 10–12 the tone arm rest mechanism is suited particularly for brush cleaning the tone arm stylus and is limited to this function. Referring to these figures, a movable element 75 is pivotally mounted by means of a shaft 76 on the base plate 77 of the record player apparatus therein depicted. In keeping with the invention as here illustrated, the movable element 75 is formed at one end with a lug 78 which extends through an opening in the base plate to form a post 79 standing above the top surface of the base plate when the element is in a rest position (Fig. 10) for supporting the tone arm. Means resiliently biasing the movable element to the rest position comprises a tension spring 80 fastened to lugs 81, 82 on the element and the plate respectively. With this arrangement, the post 79 offers a resilient support for the tone arm.

For brush cleaning the stylus in the present instance, a brush is supported on the movable element 75 under the stylus. In carrying out this operation, the tone arm rest element upon pivotal movement clockwise about its mounting shaft passes the brush bristles by the stylus for brush cleaning. It will be observed that such pivotal movement may be caused by pressing down the post 79 as by means of the tone arm, the tone arm lowering as the post drops away from under it into a shallow depression 83 formed in the base plate and conforming substantially to the under side of the tone arm so that the tone arm fits properly therein. A slot 84 may be cut in the base plate so as to enable the cartridge or stylus to move without contact with any part of the apparatus except the brush.

While the tone arm is shown in Fig. 12 in its lowered position, it will be evident that simply by releasing the tone arm and removing the pressure applied thereto to press down the lug and pivot the movable element, the resilient support offered by the post or lug is effective to return the parts to the position of Fig. 10.

Not only is the tone arm rest mechanism of simple yet effective construction, but manufacture of the various parts and assembly thereof is inexpensive and there are no parts requiring special care or maintenance. The movable element of the mechanism, moreover, is so constructed as to completely enclose the stylus end of the tone arm when the rest is in the latch position to protect the same, as previously mentioned, against the entrance of dirt and dust. It will also be observed that the movable element is effective in both the rest and latch positions to prevent the entrance of dirt and dust into the interior of the apparatus under the base plate.

I claim as my invention:

1. In a phonograph apparatus having a base and a tone arm pivotally movably mounted on the base, a tone arm rest comprising in combination, an element mounted on the base between a rest and a latch position, a spring fastened to said element and the base to form a toggle with said element, said spring biasing said element to said rest position, a lug mounted on the element to stand above the base when said element is in said rest position for supporting the tone arm above the base, said element being arranged to lower said lug upon movement of said element to said latch position, allowing said tone arm to move to a lower position, a tone arm latch mounted on said element, said latch including a tone arm engaging portion effective when said element is moved to said latch position to rigidly hold the tone arm against the base, said element being movable from the rest position to the latch position by manually pressing down said lug by means of said tone arm to pivot the element partially towards the latch position, said spring passing over toggle center upon such pivotal movement so as to bias said element through the final portion of its movement to the latch position.

2. In a phonograph apparatus having a base and a tone arm pivotally mounted on the base, a tone arm rest comprising in combination, an element pivotally mounted on the base for movement between a rest position and a latch position, means carried by said element to stand above the base when said element is in said rest position for supporting the tone arm above the base, said means being effective to lower the tone arm upon pivotal movement of said element, to said latch position, means carried by the base for supporting the tone arm in the latch position of said element, a tone arm latch mounted on said element, said latch including a portion arranged to cover the stylus end of said tone arm when said element is in said latch position for shielding the stylus end of said tone arm and engaging said tone arm for rigidly holding the tone arm against said supporting means, said element being selectively movable between the said rest and latch positions.

3. In a phonograph apparatus having a base and a tone arm with stylus pivotally mounted on the base, a tone arm rest comprising in combination, an element pivotally mounted on the base for movement between a rest position and a latch position, a post carried by the element to stand above the base when said element is in the rest position for supporting the tone arm above the base and arranged so as to swing downwardly upon pivotal movement of said element to said latch position to lower the tone arm onto the base, a tone arm latch mounted on said element, said latch including a portion movable over the tone arm and downwardly into engagement with the top thereof as an incident to such movement of said element to said latch position to rigidly hold the tone arm against the base, said element being selectively movable between the said rest and latch positions, a brush supported by said element under the tone arm, said brush being effective upon such movement of said element to engage said tone arm stylus for brush cleaning the stylus.

4. In a phonograph apparatus having a base and a tone arm with stylus pivotally mounted on the base, a tone arm rest comprising in combination, an element pivotally mounted to be pivotable on the base for movement to and from a rest position, means resiliently biasing said element to said rest position, a lug carried by said element to stand above the base when said element is in said rest position for yieldingly supporting the tone arm above the base, said element being pivotable against the yielding force offered by said resilient means by manually pressing down said lug by means of said tone arm to swing said lug downwardly to lower said tone arm, a brush supported by said element, said brush being effective upon such pivotal movement of said element to move to engage the tone arm stylus for brush cleaning the stylus.

5. In a phonograph apparatus having a base, a record turntable and a tone arm, a tone arm rest, said tone arm rest comprising in combination, an element pivotally mounted to be pivotable on the base for movement between a rest position and a latch position, means carried by said element to stand above the base when said element is in said rest position for supporting the tone arm above the base and adapted to swing downwardly to lower said tone arm upon pivotal movement of said element to said latch position, a tone arm latch mounted on said element so as to be movable over said tone arm and into engagement therewith for rigidly holding the tone arm down against said base as an incident to movement of said element to said latch position, said latch including a tone arm engaging portion fitting over for shielding the stylus end of said tone arm, said element being selectively movable between the said rest and latch positions, an "on-off" turntable motor switch mounted on the base, and means controlled by said element for actuating said switch as an incident to movement of the element between positions.

6. In a phonograph apparatus having a base, a turntable on said base, a drive for said turntable including a drive pulley and an idler wheel resiliently biased into peripheral engagement with said drive pulley and said turntable, and a tone arm with stylus pivotally mounted on said base, a tone arm rest comprising in combination, an element pivotally mounted on the base for movement between a rest position and a latch position, a lug carried by the element to stand above the base when said element is in said rest position for supporting the tone arm above the base and arranged to swing downwardly to lower said tone arm upon pivotal movement of said element to said latch position, a tone arm latch mounted on said element, said latch including a tone arm engaging portion movable against said tone arm upon pivotal movement of said element to said latch position to rigidly hold the tone arm against movement relative to the base, said element being selectively pivotable between said rest and latch positions, and means on said element operatively connecting said element to said idler wheel for shifting said idler wheel out of peripheral engagement with the pulley and turntable as said element is moved to said latch position and for returning said idler wheel into such peripheral engagement as said element is moved to said rest position.

7. In a phonograph apparatus having a base, a turntable on said base, a drive for said turntable including a motor driven pulley and an idler wheel resiliently biased into peripheral engagement with said pulley and said turntable, and a tone arm with stylus pivotally mounted on said base, a tone arm rest comprising in combination, an element pivotally mounted on the base for movement between a rest position and a latch position, a spring fastened to said element and the base to form a toggle with said element, said spring biasing said element to said tone arm rest position, a lug carried by the element to stand above the base when said element is in said rest position for supporting the tone arm above the base and arranged to swing downwardly to lower said tone arm upon pivotal movement of said element to said latch position, a tone arm latch, said latch including a tone arm engaging portion movable over said tone arm and into engagement therewith upon pivotal movement of said element to said latch position to rigidly hold the tone arm against the base, said element being selectively pivotable between the said rest and latch positions, said spring upon initial movement of said element from said rest position passing over toggle center so as to bias said element through the final portion of the movement towards the said latch position, a brush supported by said element under said tone arm adjacent said stylus, said brush being effective upon such pivotal movement of said element to engage said tone arm stylus when said tone arm is supported on said rest for brush cleaning the stylus, a turntable motor switch carried by said base, a switch member for opening and closing said switch, said switch member being biased to an open switch position, means connecting said tone arm and said switch member so that pivotal movement of said tone arm in a given lateral direction moves said switch member to close said switch, a catch biased for movement from a normally disengaged position to a position of engagement with said switch member for holding said switch member in a closed switch position, a linkage for moving and holding said catch in the disengaged position thereof, and means actuated by said element upon pivotal movement from the rest to latch positions for operating said linkage to move and hold said catch.

8. In a phonograph apparatus having a base, a turntable on said base, a drive for said turntable including a drive pulley and an idler wheel resiliently biased into peripheral engagement with said drive pulley and said turntable, and a tone arm with stylus pivotally mounted on said base, a tone arm rest comprising in combination, an element pivotally mounted on the base for movement between a rest position and a latch position, a spring fastened to said element and the base to form a toggle with said element, said spring biasing said element to said tone arm rest position, a lug carried by the element to stand above the base when said element is in said rest position for yieldingly supporting the tone arm above the base and arranged to swing downwardly to lower said tone arm upon pivotal movement of said element to said latch position, a tone arm latch mounted on said element, said latch including a tone arm engaging portion movable over said tone arm and into engagement therewith upon pivotal movement of said element to said latch position to rigidly hold the tone arm against movement relative to the base, said element being selectively pivotable between the said rest and latch positions, said spring upon partial movement of the element towards the latch position passing over toggle center so as to resiliently bias said element through the final portion of the movement, a brush supported by said element under the tone arm and adjacent the stylus, said brush being effective upon such pivotal movement of said element to move to engage said tone arm stylus when said tone arm is supported on said rest for brush cleaning the stylus, an idler wheel supported on said base for movement towards and away from said turntable, and means on said element operatively connecting the latter to said idler wheel for shifting said idler wheel out of peripheral engagement with the pulley and turntable as said element is moved to the latch position and for returning said idler wheel into such peripheral engagement as said element is moved to the rest position.

9. In a phonograph apparatus having a base, a turntable on said base, a drive for said turntable including a motor driven pulley and an idler wheel resiliently biased into peripheral engagement with said pulley and said turntable, and a tone arm with stylus pivotally mounted on said base, the combination comprising a tone arm rest including an element movably mounted on the base between a latch and a rest position, said element having a tone arm engaging portion fitting over the stylus end of said tone arm when said element is in said latch position to shield the tone arm and rigidly hold the latter against movement relative to the base, and a lug standing above the base when said element is in said rest position for supporting the tone arm above the base and arranged to swing downwardly to lower said tone arm upon movement of said element to said latch position, said element being selectively movable between the said rest and latch positions; a turntable motor switch carried by said base, said switch being movable between "on" and "off" positions; means actuated by said element upon movement from the rest to latch positions for moving said switch to the "off" position; and means actuated by said element upon movement from the rest to latch positions for shifting said idler wheel out of peripheral engagement with the pulley and the turntable.

10. In a phonograph apparatus having a base and a tone arm with stylus pivotally mounted on the base, the combination comprising, fixed support means on the base for said tone arm, a latch element movably mounted on the base, means whereby said latch element is adapted to engage and clamp said tone arm against said support means, and means including a lug carried by said latch element and operable upon retraction of the latter from engagement with the tone arm to engage the underneath of said tone arm and thereafter raise the latter to a rest position above said fixed support means.

11. In a phonograph apparatus having a base and a tone arm with stylus pivotally mounted on the base, the combination comprising, fixed support means on the base for said tone arm, a latch element movably mounted on the base and having a latch position in which the element is adapted to engage and clamp said tone arm against said support means, means including a lug carried by said latch element and operable upon retraction of the latter from engagement with the tone arm to engage the underneath of said tone arm and thereafter raise the latter to a rest position above said fixed support means, and a brush supported by said latch element in position to be engaged by said stylus upon movement of said latch member from one position to the other.

12. In a phonograph apparatus having a base and a tone arm with stylus pivotally mounted on the base, the combination comprising, fixed support means on the base for said tone arm, a latch element movably mounted on the base and having a latch position in which the element is adapted to engage and clamp said tone arm against said support means, means including a lug carried by said latch element and operable upon retraction of the latter from engagement with the tone arm to engage the underneath of said tone arm and thereafter raise the latter to a rest position above said fixed support means, over center spring means connected to said element resiliently opposing movement of said element from either position and effective after passing over center to bias said element through the final portion of the movement to the other position.

References Cited in the file of this patent

UNITED STATES PATENTS

| | | |
|---|---|---|
| 2,654,457 | Ammlung et al. | Oct. 6, 1953 |
| 2,685,447 | Ristau et al. | Aug. 3, 1954 |

FOREIGN PATENTS

| | | |
|---|---|---|
| 119,006 | Sweden | June 10, 1947 |
| 759,313 | Great Britain | Oct. 17, 1956 |